(No Model.) 5 Sheets—Sheet 1.
W. B. COULTER.
ROTARY STEAM ENGINE.
No. 482,166. Patented Sept. 6, 1892.
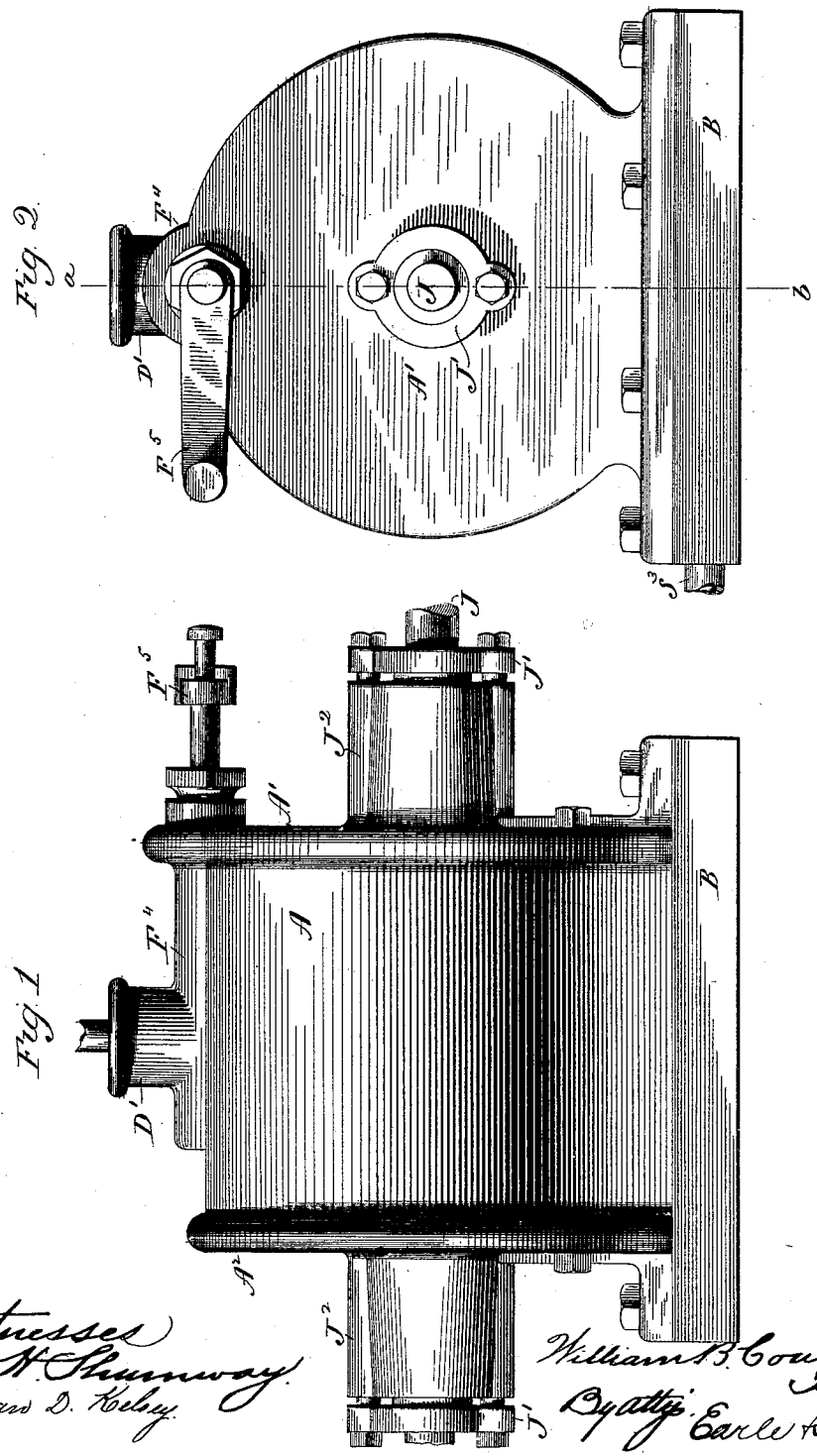

(No Model.) 5 Sheets—Sheet 2.

W. B. COULTER.
ROTARY STEAM ENGINE.

No. 482,166. Patented Sept. 6, 1892.

Witnesses
J. H. Shumway
Lillian D. Kelsey

William B. Coulter
Inventor
By atty's
Earle H. Seymour

THE NORRIS PETERS CO., PHOTO-LITHO., WASHINGTON, D. C.

(No Model.) 5 Sheets—Sheet 3.
W. B. COULTER.
ROTARY STEAM ENGINE.
No. 482,166. Patented Sept. 6, 1892.
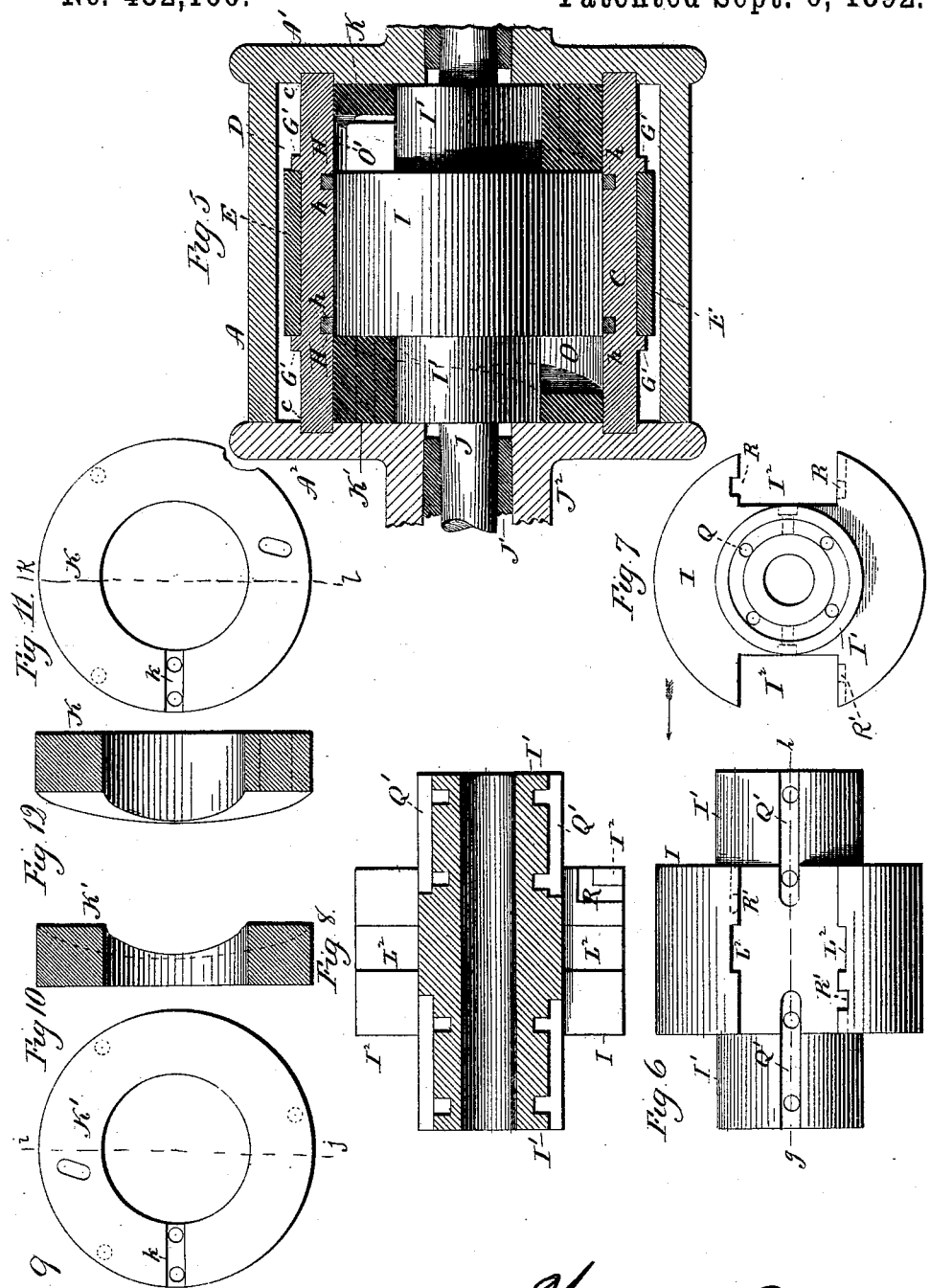

(No Model.) 5 Sheets—Sheet 4.
W. B. COULTER.
ROTARY STEAM ENGINE.
No. 482,166. Patented Sept. 6, 1892.
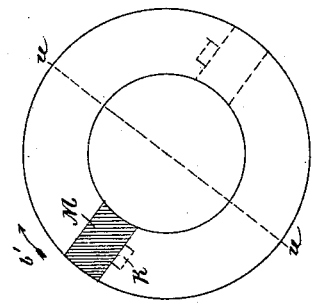
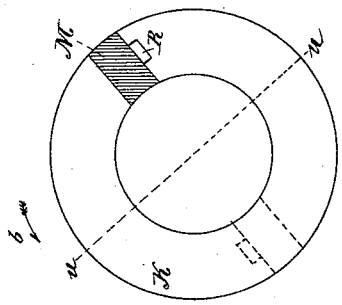
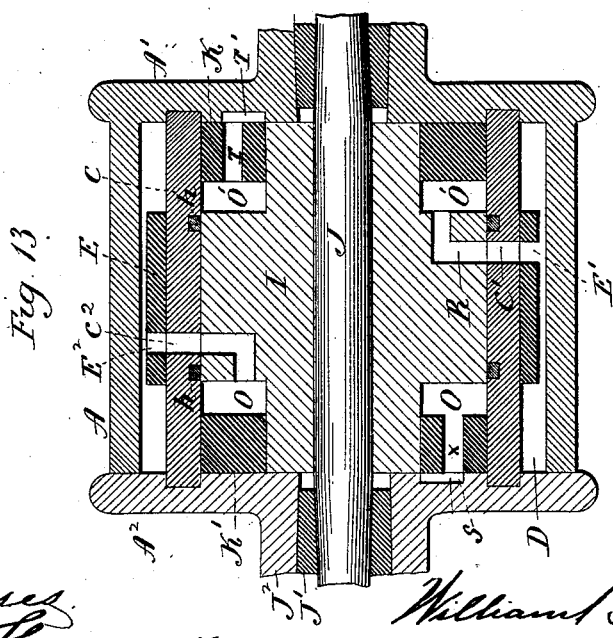

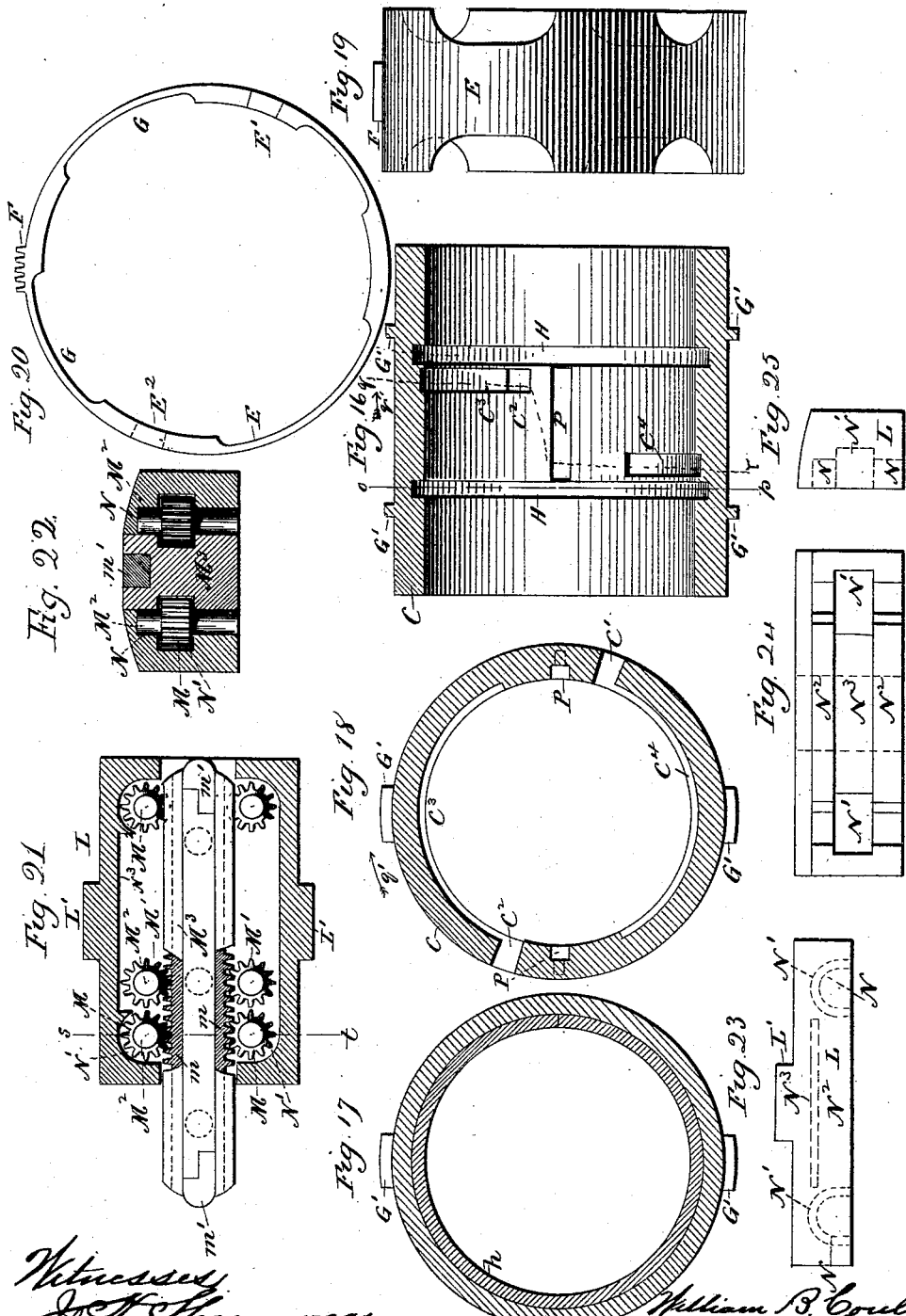

UNITED STATES PATENT OFFICE.

WILLIAM B. COULTER, OF WATERBURY, CONNECTICUT.

ROTARY STEAM-ENGINE.

SPECIFICATION forming part of Letters Patent No. 482,166, dated September 6, 1892.

Application filed December 1, 1891. Serial No. 413,741. (No model.)

*To all whom it may concern:*

Be it known that I, WILLIAM B. COULTER, of Waterbury, in the county of New Haven and State of Connecticut, have invented a new Improvement in Rotary Steam-Engines; and I do hereby declare the following, when taken in connection with accompanying drawings and the letters of reference marked thereon, to be a full, clear, and exact description of the same, and which said drawings constitute part of this specification, and represent, in—

Figure 4:
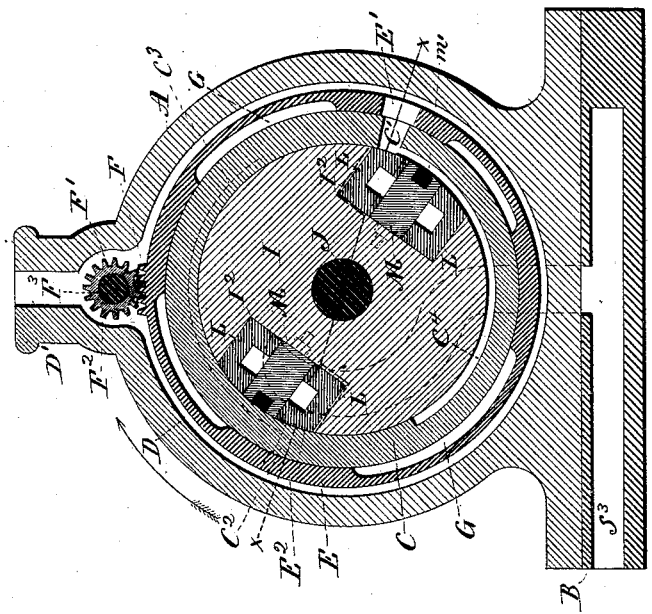
Figure 3:
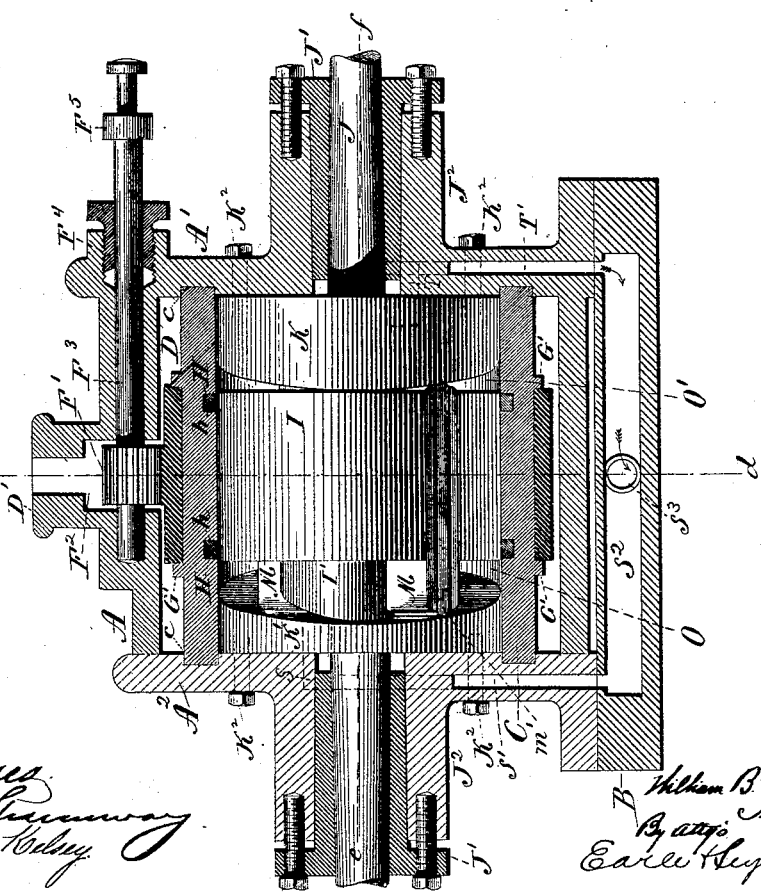

Figure 1, a view in side elevation of an engine constructed in accordance with my invention; Fig. 2, an end view thereof; Fig. 3, a view of the engine in vertical longitudinal section on the line $a\,b$ of Fig. 2; Fig. 4, a view of the engine in vertical transverse section on the line $c\,d$ of Fig. 3; Fig. 5, a view of the device in horizontal section, looking downward, on the line $e\,f$ of Fig. 3; Fig. 6, a detached plan view of the rotary piston-head with the pistons removed; Fig. 7, a similar view of the head in end elevation; Fig. 8, a view of the head in longitudinal section on the line $g\,h$ of Fig. 6, showing one of its steam-ports; Fig. 9, a detached face view of one of the cam-heads which operate the pistons; Fig. 10, a sectional view thereof on the line $i\,j$ of Fig. 9; Fig. 11, a detached face view of the other cam-head; Fig. 12, a sectional view thereof on the line $k\,l$ of Fig. 11; Fig. 13, a view of the engine in diagonal section on the line $x\,x$ of Fig. 4; Fig. 14, a transverse view, in the nature of a diagram, reproducing the right-hand end of Fig. 13; Fig. 15, a corresponding view showing the left-hand end of Fig. 13; Fig. 16, a detached view in longitudinal section of the cylinder of the engine; Fig. 17, a similar view thereof in transverse section on the line $o\,p$ of Fig. 16; Fig. 18, a similar view of the line $q\,r$ of the same figure and looking in the direction of the arrow $q'$; Fig. 19, a view of the annular cut-off in side elevation; Fig. 20, an end view thereof; Fig. 21, a detached view of one of the two-part piston-holders, which is shown partly in plan and partly in section and with the piston and pinions in place; Fig. 22, a view thereof in transverse section on the line $s\,t$ of Fig. 21; Fig. 23, a plan view of one member of the said holder; Fig. 24, a view thereof in inside elevation, and Fig. 25 an end view thereof.

My invention relates to an improvement in rotary steam-engines, the object being to produce a reliable, compact, effective, and economical engine adapted to run at a very high and uniform rate of speed.

With these ends in view my invention consists in certain details of construction and combinations of parts, as will be hereinafter described, and pointed out in the claims.

As herein shown the engine has a casing A, constructed with one integral head A' and one removable head $A^2$, the said casing and removable head being bolted to the bed B. The cylinder C is located within the said casing and has its opposite ends entered into suitable annular grooves $c\,c$, formed in the inner faces of the said heads A' and $A^2$. An annular steam-chest D, formed between the casing and the cylinder, receives live steam at its upper end through the steam connection D', which is cast integral with the casing. An annular cut-off E, located within the said chamber, encircles the cylinder at a point midway the length thereof and is constructed with two steam-inlet ports E' and $E^2$, Figs. 4 and 20, located at opposite points in its periphery in position to co-operate with corresponding ports C' and $C^2$, formed in the periphery of the cylinder C. The said cut-off E is provided at its upper end with a short rack F, the teeth whereof mesh into a pinion F', located in a chamber $F^2$, formed in the upper portion of the casing A and mounted on a horizontal shaft $F^3$, which is journaled in the upper portion of the casing in a box $F^4$, formed integral therewith, and provided at its outer end with an arm $F^5$, Figs. 1, 2, and 3, which preferably has a regulator of approved construction connected with it, whereby the cut-off is slightly oscillated on the cylinder to admit more or less steam thereinto, as required to maintain a uniform running rate in the engine. The said arm $F^5$ may also be used as a manual lever for cutting the steam entirely off from the engine. Between the inlet-ports E' and $E^2$ of the cut-off the same is cut away both inwardly from its edges and transversely clear across its inner face to form four approximately quartering clearance-spaces G, Fig. 20, which reduce its area of friction on the cylinder, lessen its weight, and also permit it to be introduced between the two independent sets or series of similarly-arranged or quartering guiding-lugs G', formed on the periphery of the cylinder, the lugs of one set being separated from those of the other set just enough to permit the cut-off E to be interposed between them with a capacity for oscillation. To introduce the cut-off between the said sets of lugs, its clearance-spaces G are first registered with one set of lugs, over which the cut-off is then slipped and subsequently turned a qurater-turn, whereby the unbroken portions of its edges are brought between the lugs, which then secure it against lateral displacement. The pinion F' is then engaged with the rack F, so as to prevent the cut-off from turning enough in either direction to align its clearance-spaces with the lugs. To remove the cut-off, the pinion is disengaged from its rack, after which it is turned to align its spaces with either of said sets of lugs, permitting it to be readily drawn over them and away from the cylinder. Two annular grooves H H, formed in the inner periphery of the cylinder, receive packing-rings $h\ h$, which are spaced so as to be in position to engage with the respective edges of the periphery of a rotary cylindrical piston-head I, mounted upon the main shaft J, the slightly-tapering ends of which are journaled in correspondingly-tapered adjustable sleeves J', located in boxes $J^2$, which project outwardly from the respective heads A' and $A^2$ of the casing. The said piston-head I, Fig. 6, is provided with two comparatively large hubs or trunnions I' I', which have bearing, respectively, in two cam-heads K and K', secured by bolts $K^2$ to the inner faces of the heads A' and $A^2$ of the casing and projecting inwardly into the opposite ends of the cylinder C. At opposite points in its periphery the piston-head is cut away to form two deep rectangular chambers $I^2\ I^2$, which respectively receive two two-part piston-holders, each composed of two corresponding members L L, each provided upon its outer face and midway of its length with a wide transverse rib L', the said ribs entering corresponding grooves $L^2\ L^2$, Fig. 6, offsetting from the opposite sides of the chambers $I^2\ I^2$, whereby the said members are held against lateral displacement. Transversely-reciprocal pistons $M^3\ M^3$ are respectively placed between the respective members of the said piston-holders, so as to rest upon the bottoms of the said chambers $I^2\ I^2$, which are thereto provided with self-adjusting packing-strips Q' Q'. Each piston is interposed between six small pinions, the trunnions $M^2$ whereof form antifriction-bearings. These pinions are arranged in three pairs, the pinions M of the end pairs being confined and the pinions M' of the intermediate pair being free to travel back and forth. To this end the inner face of each of the said members L has two U-shaped recesses N formed in each of its ends to receive the trunnions $M^2$ of the pinions M, with a clearance-space N' between the recesses of each pair to receive the said pinions, which are thus permitted to rotate freely, but confined otherwise. The inner face of each of the said members L is constructed between its said recesses with two corresponding straight faces $N^2\ N^2$, forming bearings for the trunnions $M^2$ of the pinions M', which are entered into a clearance-space $N^3$, corresponding in depth to the space N' before referred to. When the pinions are in place, they project slightly beyond the inner faces of the said members and mesh into recessed racks $m\ m$, formed in the opposite faces of the pistons and extending throughout the length thereof. The trunnions take the strain from the pistons, while the racks and pinions insure the turning of the trunnions, so that they wear uniformly.

Each piston is provided with a self-adjusting packing m', located in its outer edge, extending throughout its length, and projecting beyond its ends. The outer edges of both of the said pistons engage with the inner face of the cylinder, while their ends are constantly engaged with the operating-faces of the cam-heads K and K' before referred to. Each of the said cam-heads is cylindrical in cross-section and has an irregular or winding operating-face configurated to form virtually two independent continuously-pitched half-spirals extending in opposite directions and connected at their ends, so that while one spiral approaches the contiguous face of the piston-head the other spiral recedes from it. These two heads are relatively arranged, so that their faces will stand just reversed—that is, the receding spiral of the operating-face of one head will be exactly opposite the projecting spiral of the operating-face of the other head, and vice versa, opposite points in the said faces being equidistant. Preferably and as herein shown the spirals will be in planes at a right angle to the main shaft J; but that is not necessary, although whatever their inclination be it must be uniform, and the inclination of the piston-head must correspond to it. Furthermore, the said cam-heads and piston-head are constructed so that the highest points of the cam-heads, or, in other words, those points thereof which have the most inward projection, are constantly engaged with the contiguous faces of the piston-head, the said points of the cam-heads being thereto provided with self-adjusting packings $k\ k$, Figs. 9 and 11, whereby the cam-heads, piston-head and valves co-operate to form the steam-chambers O and O', which are respectively located on opposite sides of the piston-head. Each of these chambers is further divided virtually into a compartment for live and for exhaust steam, as will be hereinafter described. It will be now understood that when the piston-head rotates the peculiar reversed spiral operating-faces of the cam-heads will operate to reciprocate the pistons transversely, or move them back and forth, so that they will alternately project from opposite faces of the piston-head, the projection of one piston on one side of the head being exactly commensurate with the projection of the other piston on the opposite side thereof. The two steam-chambers O O', respectively formed on opposite sides of the valve-head, are annular in form, but tapering in transverse section, embracing as they do the spaces between the respective faces of the piston-head and the operating-faces of the cam-heads. The chambers O O' are isolated from each other by means of self-adjusting packings P P, located at opposite points within the cylinder C, Fig. 18, and situated between the steam-ports E' and E², the said packings preventing the steam from escaping from one chamber into the other over the periphery of the piston-head, which is itself packed at the ends of its trunnions, Figs. 6 and 7, by self-adjusting packing-rings Q and by self-adjusting strips Q', Fig. 8, inserted longitudinally in the trunnions at opposite points therein and designed to prevent the steam from blowing around the peripheries thereof from one to the other of the two sub-chambers into which each of the steam-chambers O and O' is divided by the pistons when the engine is in operation.

The steam-ports C' and C², formed at opposite points in the cylinder, respectively lead into segmental steam-ducts C³ C⁴, formed in the inner periphery thereof, extending in opposite directions parallel with each other, and located just within the respective packing-rings $h$ $h$. These ducts may vary in length, according to the length of time which it is desired the piston-head shall take steam. These ducts coincide with L-shaped steam-ports R R, respectively formed on the piston-head opposite each other and on opposite sides thereof, one being located adjacent to each of its deep transverse chambers I² I². These ports enter the piston-head from its periphery, on which they are arranged to coincide with the said ducts, and emerge from its sides into the respective steam-chambers. The steam-chamber O exhausts through an exhaust-port X, extending transversely through the cam-head K and leading into a vertical passage S', formed in the removable casing-head A and opening at its lower end into an exhaust-chamber S², formed in the engine-bed B. On the other hand, the steam-chamber O' exhausts through a corresponding exhaust-port T, located diagonally opposite to the port S and leading into a vertical steam-passage T', formed in the integral head A' of the casing and opening at its lower end into the aforesaid chamber S², which is provided with a discharge-pipe S³.

Having now fully described my improved engine in detail, I will proceed to set forth its mode of operation. By referring to Figs. 14 and 15 of the drawings it will be noticed that each of them is provided with a diagonal line $u$. These lines $u$ intersect the operating-faces of the cam-heads, respectively, at the points thereof which are engaged with the faces of the piston-head and which are against the deepest portions of the steam-chambers, the crosses on the lines indicating the points of contact. With reference now to Fig. 14 of the drawings, which represents the right-hand side of Fig. 13, it will be seen that the right-hand end of the piston M passes the right-hand L-shaped inlet-port R of the piston-head at a point about a quarter of a turn in advance of the point where the right-hand face of the piston-head and the operating-face of the right-hand cam-head K are in contact, and therefore when the piston is in its intermediate position or projecting as much from one side of the piston-head as from the other side thereof, this position being the one in which the piston makes its minimum exposure to the action of the steam. The steam now entering the right-hand steam-chamber O through the port R will impinge against the said right-hand end of the piston and cause the piston-head to rotate in the direction of the arrow $b$, whereby the operating-faces of the cam-heads will cause the piston to move to the right, until at the completion of a quarter-turn from the point where the steam was taken it reaches its maximum right-hand projection, so that during the first quarter-turn after the piston M has taken steam its exposure rises from the maximum to the minimum. From this point the operating-faces of the cam-heads operate to gradually move the piston to the left, until at the conclusion of another quarter-turn it has been restored again to its intermediate position and passed back from its maximum to its minimum exposure. The right-hand end of the piston now passes the exhaust-port T in the cam-head K, permitting the spent steam in the right-hand steam-chamber O to be exhausted. It will be understood, also, that during the time that the piston has been taking steam at its right-hand end the steam in front of its left-hand end in the left-hand steam-chamber O' has been exhausted through the exhaust-port S in the cam-head K'. The left-hand end of the same piston (see Fig. 15) now passes the inlet-port R' in the piston-head and takes steam during the next half-revolution thereof, its exposure rising from the minimum to the maximum during the first quarter of its movement and falling from the maximum to the minimum during the second quarter thereof in the manner described for its opposite end, the piston-head being still rotated in the direction of the arrow $b$. It will thus be seen that one end of the piston is under pressure of steam during one-half of the revolution of the head and its other end during the remaining half of such revolution. The other piston operates at the same time and in the same way, but for clearness of description has not been referred to. It will be understood that from the point where the steam is cut off to the point where it is exhausted it operates expansively, that economical use of it being made possible by the peculiar shape of the faces of the cam-heads and by arranging the pistons at the same distance apart as the inlet and exhaust ports. By the peculiar shape, also, of the faces of the cam-heads my improved engine operates very easily and with the minimum of racking and vibration, inasmuch as they operate upon the pistons uniformly and do not require the same to make sudden movements, as do cam-faces which do not gradually rise and fall, so to speak, as do the faces of my cam-heads.

I do not limit myself to the use of the two pistons, for one might be used, if desired, without changing the conformation of the operating-faces of the cam-heads. Nor do I limit myself to the other details of construction herein shown and described, as they may obviously be changed without departing from the spirit and scope of my invention.

I am aware that it is old to operate a transversely-reciprocal piston by means of two corresponding cam-heads located on opposite sides of a rotary piston-head which carries the piston, and therefore do not claim such a construction, broadly, but limit myself, so far as the shape of the faces of the cam-heads is concerned, to the so-called "continuously-pitched" spiral form herein shown and described.

Having fully described my invention, what I claim as new, and desire to secure by Letters Patent, is—

1. In a rotary steam-engine, the combination, with a cylinder, of a rotary piston-head located therein, two corresponding cam-heads located on opposite sides of the piston-head, having their operating-faces equidistant at opposite points from each other and each composed of corresponding continuously-pitched spirals merging into each other at their ends to form a continuous track, and one or more transversely-reciprocal pistons mounted in the said head and having their opposite ends engaged with the faces of the respective cam-heads, which are engaged at one or more points by the respective faces of the piston-head, so as to co-operate with the said piston or pistons in forming steam-chambers, substantially as described.

2. In a rotary steam-engine, the combination, with a cylinder having peripheral steam-inlet ports, of a rotary piston-head located therein and having steam-inlet ports arranged to coincide with those in the cylinder and entering its periphery and issuing from its sides, two corresponding cam-heads located on opposite sides of the piston-head and each having an exhaust-port opening out of its operating-face, and one or more transversely-reciprocal pistons mounted in the said head and having their opposite ends engaged with the faces of the respective cam-heads, which are engaged at one or more points by the respective faces of the piston-head, so as to co-operate therewith in forming steam-chambers, substantially as described.

3. In a rotary steam-engine, the combination, with a cylinder having one or more peripheral steam-inlet ports, of a rotary piston-head having steam-inlet ports entering its periphery and issuing from its sides, two corresponding cam-heads respectively located on opposite sides of the said head and having oppositely-winding operating-faces which are respectively equidistant at opposite points from each other, one or more transversely-reciprocal pistons mounted in the said head and having their opposite ends engaged with the faces of the respective cam-heads, which are respectively engaged at one or more points by the respective faces of the piston-head, so as to co-operate with the piston or pistons in forming steam-chambers, and exhaust-ports leading from the said chambers, substantially as described.

4. In a rotary steam-engine, the combination, with a cylinder having peripheral steam-inlet ports, of two cam-heads respectively located in the opposite ends of the said cylinder, having the opposite points in their operating-faces equidistant from each other and each having an exhaust-port and a large central opening, a piston-head located between the said heads, engaging with the highest points in the faces thereof, having heavy hubs which bear in the central openings of the said heads, and constructed with steam-inlet ports entering its periphery in position to coincide with the ports in the cylinder and issuing from its sides, and one or more transversely-reciprocal pistons mounted in the said head and having their opposite ends engaged with the faces of the respective cam-heads, substantially as described.

5. In a rotary steam-engine, the combination, with a cylinder having two or more peripheral inlet-ports and segmental ducts leading therefrom and following its inner periphery, of a piston-head having inlet-ports entering its periphery and arranged thereon to coincide with the said ports and ducts of the cylinder and issuing from its sides, two cam-heads respectively located at the ends of the cylinder and having irregular or winding operating-faces which are uniformly separated from each other, and one or more transversely-reciprocal pistons mounted in the said head and having their opposite ends engaged with the faces of the respective cam-heads, the highest points whereof are engaged by the respective faces of the piston-head, substantially as described.

6. In a rotary steam-engine, the combination, with a cylinder having segmental steam-ducts formed in the inner face of its periphery, of a rotary piston-head having steam-ports arranged to coincide with the said ducts, two cam-heads respectively located on opposite sides of the said head and having irregular or winding operating-faces which are equidistant at opposite points from each other, and one or more transversely-reciprocal pistons mounted in the said head and having their opposite ends engaged with the faces of the respective cam-heads, which are respectively engaged at one or more points by the respective faces of the piston-head, so as to co-operate with the pistons in forming steam-chambers, substantially as described.

7. In a rotary steam-engine, a rotary piston-head having one or more deep transverse chambers formed in its periphery, a piston-holder set into each of said chambers, a piston mounted in each block piston-holder, and antifriction-pinions mounted in the block piston-holder on opposite sides of the piston, which is thereto furnished with racks, substantially as described.

8. In a rotary steam-engine, the combination, with a rotary piston-head having one or more deep transverse chambers formed in its periphery, of a two-part chambered piston-holder set into each of said chambers, a piston set into each holder and having its opposite faces provided with longitudinal racks, and pinions set into the holder on opposite sides of the piston, engaging with the racks thereof, and taking the strain of its operation upon their journals, substantially as described.

9. In a rotary steam-engine, the combination, with a cylinder having one or more peripheral inlet-ports, of a steam-chest surrounding the said cylinder, an annular cut-off located in the said chest encircling the cylinder and having inlet-ports coinciding with those in the cylinder, means for oscillating the cut-off to gage the amount of steam admitted to the cylinder, one or more pistons located in the cylinder, means for rotating and operating them, and exhaust-ports leading out of the said cylinder, substantially as described.

10. In a rotary steam-engine, the combination, with a cylinder having one or more inlet-ports in its periphery, of a steam-chamber surrounding the said cylinder, an annular cut-off located in the said chamber encircling the cylinder, having peripheral ports coinciding with the ports therein and furnished with a rack, a pinion engaged with the said rack, means for operating the pinion to oscillate the cut-off on the cylinder, a rotary piston-head located in the cylinder, one or more pistons mounted in the said head, and exhaust-ports leading out of the cylinder, substantially as described.

In testimony whereof I have signed this specification in the presence of two subscribing witnesses.

WILLIAM B. COULTER.

Witnesses:
JOHN P. LAWLOR,
EDWARD F. COLE.